March 19, 1946.  H. MAXWELL  2,396,738

DYNAMO-ELECTRIC MACHINE

Filed Jan. 2, 1943

Inventor:
Howard Maxwell,
by Harry E. Dunham
His Attorney.

Patented Mar. 19, 1946

2,396,738

UNITED STATES PATENT OFFICE 2,396,738

DYNAMOELECTRIC MACHINE

Howard Maxwell, Schenectady, N. Y., assignor to General Electric Company, a corporation of New York Application January 2, 1943, Serial No. 471,146

13 Claims. (Cl. 172—36)

My invention relates to dynamo-electric machines and particularly to such machines wherein it is desirable to enclose the stator core and winding separately from the rotatable member of the machine.

An object of my invention is to provide an improved dynamo-electric machine with an enclosed stationary member.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
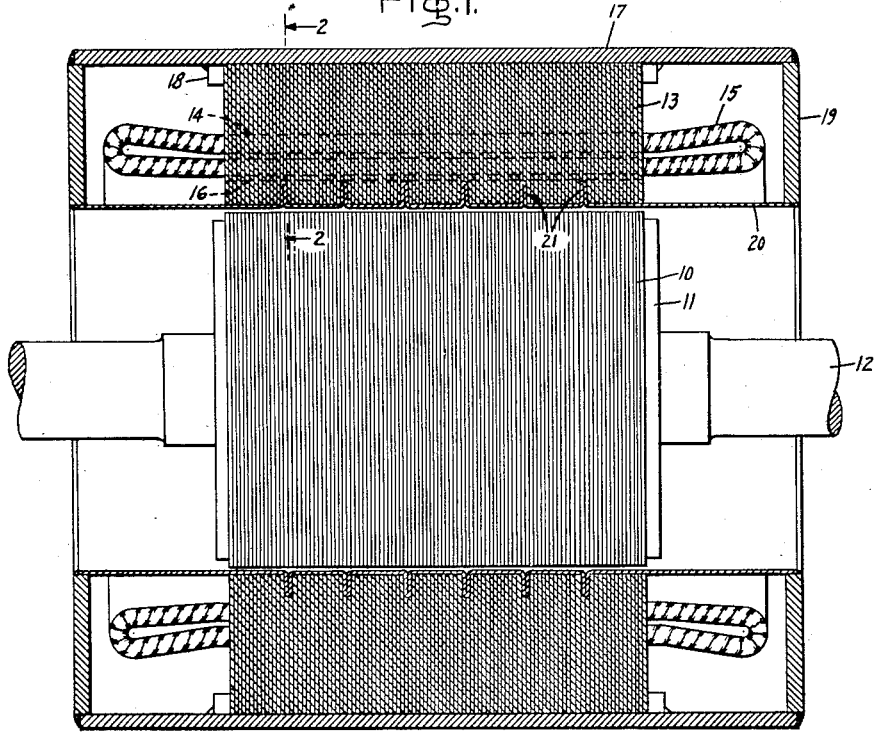
Figure 2:
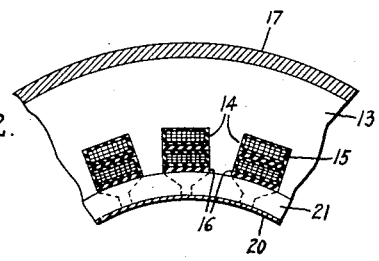

In the drawing, Fig. 1 is an elevational view, partly in section, of a dynamo-electric machine provided with an embodiment of my invention; Fig. 2 is a sectional view taken along line 2—2 of Fig. 1 showing a part of the stator of the machine; and Fig. 3 is a partial side elevational view in section of a stationary member of a machine provided with another embodiment of my invention.

Referring to the drawing, I have shown a dynamo-electric machine which is adapted to be used in locations where the medium which surrounds the machine may be injurious to either or both the stator core and winding if it is permitted to come in contact therewith. The machine illustrated is an induction motor provided with a conventional laminated rotor core 10 having a squirrel cage winding 11 therein and supported on a shaft 12. The stationary member of the machine is provided with a core 13 formed of laminations of magnetic material having winding slots 14 formed therein in which a winding 15 is arranged. Insulating retaining elements 16 may be arranged on the outer side of the winding 15 adjacent the opening of the winding slots 14 to hold the winding in position if this is found desirable. The stationary member core 13 is mounted in a shell or frame 17 arranged about the outer side of the laminations 13 and is held in position in the frame 17 by a pair of retaining end rings 18 arranged in engagement with the outer laminations of the core and secured to the frame 17 in any suitable manner, as by welding. The laminations 13 of the stationary member core and the winding 15 are arranged within an enclosure which includes end plates 19 secured to the stator frame or shell 17 and provided with a relatively thin tubular member 20, preferably of material having a relatively high resistance, which extends between the end plates 19 and is secured thereto in any suitable manner to form a fluid-tight joint therewith, so that the laminations 13 and the winding 15 are enclosed in a substantially fluid-tight housing. The tubular member 20 is formed with a plurality of outwardly extending ring shaped projections 21 as shown in Fig. 2, in the form of corrugations which extend outwardly from the outer side of the tubular member into grooves or slots in the core 13 between certain of the laminations and may be made to extend substantially into engagement with the outer surface of the winding retaining elements 16 if desired, so as to provide for a ready transfer of heat between the tubular member 20 and the laminations of the core and to stiffen and strengthen the tubular member 20.

Figure 3:
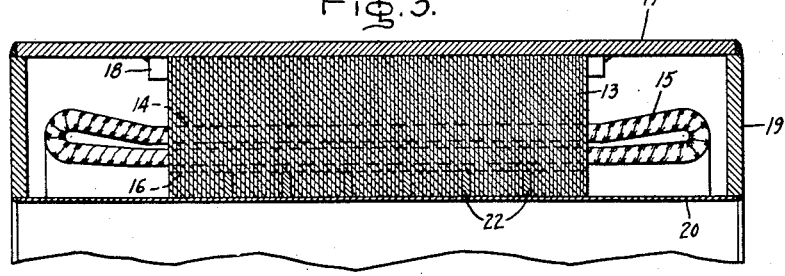

In Fig. 3 I have shown a modification of the arrangement shown in Figs. 1 and 2 in which the dynamo-electric machine may be provided with any suitable rotatable member similar to the rotor shown in Fig. 1. The general construction of the stationary member in this embodiment of my invention is the same as that shown in Figs. 1 and 2, except that the projections formed on the tubular member 20 are in the form of rings 22 suitably secured to the member 20 and preferably integrally joined thereto, as by welding or brazing to insure a good thermal heat transfer connection therewith. As in the arrangement shown in Fig. 1, these projecting rings extend outwardly from the outer side of the tubular member 20 into grooves or slots in the core 13 between certain of the laminations to provide for stiffening of the tubular member. These elements also are securely held between certain of the laminations to provide for transferring heat between the tubular member 20 and the laminations of the core.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine including a rotatable member and a stationary member having a core formed of laminations with winding slots therein, a winding in said winding slots, an enclosure extending about a portion of said core and said winding including a relatively thin tubular member extending between said core and said rotatable member, and means including projections on said tubular member extending outwardly between certain of said laminations for transferring heat between said tubular member and said laminations.

2. A dynamo-electric machine including a rotatable member and a stationary member having a core formed of laminations with winding slots therein, a winding in said winding slots, an enclosure about said core and winding including a relatively thin tubular member extending between said core and said rotatable member, and means including projections integral with said tubular member extending outwardly between certain of said laminations for stiffening said tubular member and for transferring heat between said tubular member and said laminations.

3. A dynamo-electric machine including a rotatable member and a stationary member having a core formed of laminations with winding slots therein, a winding in said winding slots, an enclosure extending about a portion of said core and said winding including a relatively thin member extending between said core and said rotatable member arranged substantially in engagement with the inner surface of said core, and means including projections on said tubular member extending outwardly between certain laminations for transferring heat between said tubular member and said laminations.

4. A dynamo-electric machine including a rotatable member and a stationary member having a core formed of laminations with winding slots therein, a winding in said winding slots, an enclosure extending about a portion of said core and said winding including a relatively thin tubular member extending between said core and said rotatable member, and means including projections formed as corrugations on said tubular member extending outwardly between certain of said laminations for stiffening said tubular member and for transferring heat between said tubular member and said laminations.

5. A dynamo-electric machine including a rotatable member and a stationary member having a core formed of laminations with winding slots therein, a winding in said winding slots, an enclosure extending about a portion of said core and said winding including a tubular member extending between said core and said rotatable member, and means including projections formed as rings on said tubular member extending outwardly between certain of said laminations for stiffening said tubular member and for transferring heat between said tubular member and said laminations.

6. A dynamo-electric machine including a rotatable member and a stationary member having a core formed of laminations with winding slots therein, a winding in said winding slots, winding retaining elements arranged above said winding in said slots, an enclosure extending about a portion of said core and said winding including a relatively thin tubular member extending between said core and said rotatable member arranged substantially in engagement with the inner surface of said core, and means including projections on said tubular member extending outwardly between certain of said laminations for transferring heat between said tubular member and said laminations and for retaining said winding retaining elements in position in said slots.

7. A dynamo-electric machine including a rotatable member and a stationary member having a core formed of laminations with winding slots therein, a winding in said winding slots, winding retaining elements arranged above said winding in said slots, an enclosure extending about a portion of said core and said winding including a tubular member extending between said core and said rotatable member, and means including projections on said tubular member extending between certain of said laminations for transferring heat between said tubular member and said laminations, said projections extending from the outer side of said tubular member substantially into engagement with said winding retaining elements.

8. A dynamo-electric machine including a rotatable member and a stationary member having a core formed of laminations with winding slots therein, a winding in said winding slots, winding retaining elements arranged above said winding in said slots, an enclosure extending about a portion of said core and said winding including a tubular member extending between said core and said rotatable member, and means including projections on said tubular member extending between certain of said laminations for transferring heat between said tubular member and said laminations, said projections being formed as corrugations in the tubular member extending from the outer side of said tubular member substantially into engagement with said winding retaining elements.

9. A dynamo-electric machine including a rotatable member and a stationary member having a core formed of laminations with winding slots therein, a winding in said winding slots, winding retaining elements arranged above said winding in said slots, an enclosure extending about a portion of said core and said winding including a tubular member extending between said core and said rotatable member, and means including projections on said tubular member extending between certain of said laminations for transferring heat between said tubular member and said laminations, said projections being formed as rings integrally secured to and extending from the outer side of said tubular member substantially into engagement with said winding retaining elements.

10. A dynamo-electric machine including a rotatable member and a stationary member having a core formed of laminations with winding slots therein, a winding in said winding slots, an enclosure extending about a portion of said core and said winding including a relatively thin tubular member extending between said core and said rotatable member, and means including projections on said tubular member extending circumferentially and outwardly into said core for transferring heat between said tubular member and said laminations.

11. A dynamo-electric machine including a rotatable member and a stationary member having a core formed of laminations with winding slots therein, a winding in said winding slots, an enclosure about said core and winding including a relatively thin tubular member extending between said core and said rotatable member, and means including axially extending projections integral with said tubular member extending outwardly in circumferentially spaced apart relationship into said core for stiffening said tubular member and for transferring heat between said tubular member and said laminations.

12. A dynamo-electric machine including a rotatable member and a stationary member having a core formed of laminations with winding slots therein, a winding in said winding slots, an enclosure about said core and winding including a relatively thin tubular member extending between said core and said rotatable member, and means including projections integral with said tubular member extending outwardly and circumferentially in axially spaced apart relationship into said core for stiffening said tubular member and for transferring heat between said tubular member and said laminations.

13. A dynamo-electric machine including a rotatable member and a stationary member having a core formed of laminations with winding slots therein, a winding in said winding slots, winding retaining elements arranged above said winding in said slots, an enclosure extending about a portion of said core and said winding including a tubular member extending between said core and said rotatable member, and means including projections extending circumferentially and in axially spaced apart relationship on said tubular member into said core between certain of said laminations for transferring heat between said tubular member and said laminations, said projections being formed as corrugations in the tubular member extending from the outer side of said tubular member substantially into engagement with said winding retaining elements.

HOWARD MAXWELL.